Nov. 13, 1923.

D. CAIRELLA 1,474,188

HORN OPERATING MECHANISM

Filed Jan. 24, 1922

INVENTOR.
Daniel Cairella
BY Wooster & Davis
ATTORNEYS.

Patented Nov. 13, 1923.

1,474,188

UNITED STATES PATENT OFFICE.

DENIEL CAIRELLA, OF SHELTON, CONNECTICUT.

HORN-OPERATING MECHANISM.

Application filed January 24, 1922. Serial No. 531,411.

*To all whom it may concern:*

Be it known that I, DENIEL CAIRELLA, a subject of the King of Italy, residing at Shelton, county of Fairfield, State of Connecticut, have invented an Improvement in Horn-Operating Mechanism, of which the following is a specification.

This invention relates to mechanism for operating automobile horns, especially horns in which the push button is mounted on one side of the steering column. With arrangements of this type, when the operator wishes to sound the horn, he is required to remove one hand from the steering wheel to press the push button, which requires a certain amount of time, thus delaying the sounding of the horn, and may interfere with the operation of the machine in an emergency.

It is, therefore, an object of this invention to provide means for pressing the button from a point adjacent the rim of the steering wheel without requiring the operator to remove his hand therefrom.

It is a further object of the invention to provide a device of this type which may be easily and quickly applied to a steering column without, in any way, reconstructing or arranging the mechanisms thereon.

It is a still further object of the invention to carry out the function desired by means of a simple attachment which may be made up and kept in stock by an accessories man, and may be sold to an owner of a machine and applied by him without the employment of a skilled mechanic.

With these and other objects in view I have devised the device disclosed in the accompanying drawing, in which—

Figure 1:
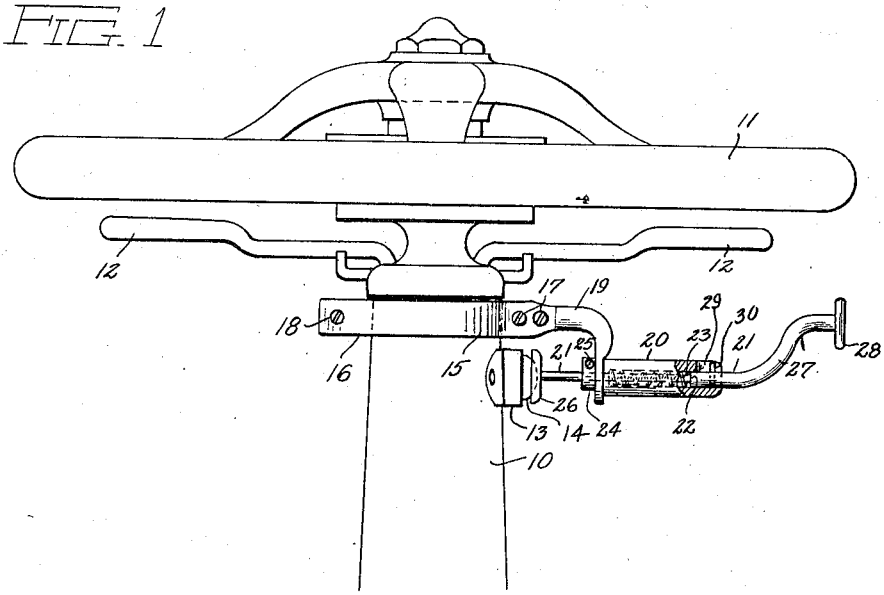
Figure 2:
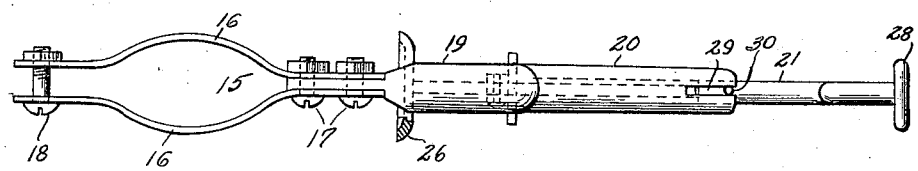

Fig. 1 is a front view of the top of the steering column of an automobile of the Ford type showing my attachment applied thereto and its relative position with respect to the steering wheel, and Fig. 2 is a top plan view of the device detached from the column.

Although I have shown my device as applied to a column of the Ford type, it is not necessarily limited thereto but may be used on any machine where the push button for the horn is located on one side of the column.

In the drawing, the column is represented by the numeral 10 with the steering wheel 11 at the top thereof and the throttle and spark levers 12 immediately thereunder. Secured to one side of the column is a casing 13 in which is mounted the button 14 for closing the electrical connection to the horn in a manner well known, and, therefore, this specific mechanism is not illustrated.

Clamped to the column, preferably above the push button, is my device comprising a support 15 preferably made of two flat strips of metal 16 secured together by any suitable means, such as screws 17, and bowed, substantially as shown in Figure 2, to embrace the column 10 and provided at their free ends with suitable clamping means, such as a screw 18. Also secured to these strips by the screw 17, is an element 19 which is bent downwardly, as shown in Figure 1, and carries a cylindrical guide or bearing 20 within which is slidably mounted a rod 21, the member 19 being curved to bring this rod in alignment with the button. In the form shown, the rod is provided with a shoulder 22 within the guide 20, with a coil spring 23 embracing this rod and bearing at opposite ends against the shoulder 22 and the inner end of the guide 20, so that it tends to move the rod away from the button. This movement is limited by a collar 24 adjustably clamped to the rod by any suitable means, as a screw 25, and abuts against the opposite side of the member 19. To the inner end of the rod is secured a disc 26, preferably concaved or dished as shown so that it is not likely to slide off the button in operation. The collar 24 is adjusted on the rod to properly locate the disc 26 with respect to the button as these are of different heights. The outer portion of the rod is bent, if required, as shown at 27, to bring the outer end adjacent the steering wheel 11, this end being preferably provided with a disc or knob 28 to facilitate operation of the rod. The rod is formed to bring the knob in the position about as shown in Figure 1 with reference to the steering wheel, that is, spaced therefrom a sufficient distance so that when the operator's fingers are curved around the rim of the wheel, and the wheel is rotated, the fingers may move by the knob 28 without touching the same, but it should be located sufficiently near to the wheel that the fingers may be straightened and press against this knob without removing the hand from the wheel, it being obvious that pressure on this knob toward the column will operate the button 14 as effectively as a corresponding pressure directly upon the button itself. If the rod 21 is bent to bring either the knob 28 or disc 26 out of alignment with the portion of the rod in the bearing or guide 20, then some means should be provided for preventing turning of the rod in this bearing. A satisfactory means of doing this is shown and comprises a slot 29 in the bearing and a pin 30 carried by the rod 21 and extending into this slot.

It will be apparent from an inspection of the drawing that the device is very simple in construction and may be quickly and very easily applied to a steering column by anyone without the necessity of hiring a skilled mechanic. It is also positive in operation and so is reliable, and is not likely to be easily gotten out of order and, as the operator may operate the same with his fingers without removing his hand from the steering wheel, no time is lost in groping for the push button, nor does it interfere with the operation of the machine.

Having thus set forth the nature of my invention what I claim is:

1. A device for controlling an automobile horn operated by means of a button on the side of the steering column, comprising a support adapted to be clamped to the column, a rod mounted to slide in this support and adapted to contact at one end with the button and at the other end to extend adjacent the rim of the steering wheel.

2. A device for controlling an automobile horn operated by means of a button on the side of the steering column, comprising a support adapted to be clamped to the column, a tubular guide carried by the support, a rod slidably mounted in the guide, a disc carried by the rod and adapted to press against the button, and said rod provided at its other end with a knob adjacent the rim of the steering wheel.

3. A device for controlling an automobile horn operated by means of a button on the side of the steering column, comprising a support adapted to be clamped to the column, a tubular guide carried by the support, a rod mounted to slide in the guide and adapted to rest at one end against the button and at the other to extend adjacent the rim of the steering wheel, and a spring tending to move the rod away from the button.

4. A device for controlling an automobile horn operated by means of a button on the side of the steering column, comprising a support adapted to be clamped to the column, a guide carried by the support, a rod mounted to slide in the guide and adapted to contact with the button and extend to a point adjacent the rim of the steering wheel, a spring tending to move the rod away from the button, and a stop collar adjustably secured to the rod to limit its movement under the action of the spring.

In testimony whereof I affix my signature.

DENIEL CAIRELLA.